United States Patent
Hackett et al.

(10) Patent No.: US 9,693,622 B1
(45) Date of Patent: Jul. 4, 2017

(54) WEARABLE DEVICE MOUNT

(71) Applicant: SYMBOL TECHNOLOGIES, LLC, Lincolnshire, IL (US)

(72) Inventors: Edward Anthony Hackett, Surbiton (GB); Chandra M. Nair, Mount Sinai, NY (US); Sunghun Lim, Bethpage, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/096,742

(22) Filed: Apr. 12, 2016

(51) Int. Cl.
| | | |
|---|---|---|
| *H04M 1/00* | (2006.01) | |
| *A45F 5/00* | (2006.01) | |
| *A45C 11/00* | (2006.01) | |
| *H04B 1/3827* | (2015.01) | |

(52) U.S. Cl.
CPC ............ *A45F 5/00* (2013.01); *A45C 11/00* (2013.01); *H04B 1/385* (2013.01); *A45C 2011/002* (2013.01); *A45F 2005/008* (2013.01)

(58) Field of Classification Search
CPC ............ A45F 5/00; A45C 11/00; H04B 1/385
USPC ............................................ 455/575.1, 575.6
See application file for complete search history.

(56) References Cited

U.S. PATENT DOCUMENTS

| | | | | | |
|---|---|---|---|---|---|
| 5,305,181 | A * | 4/1994 | Schultz | ................... | B60R 11/02 345/168 |
| 5,819,183 | A * | 10/1998 | Voroba | ................... | H04B 1/385 368/13 |
| 8,554,292 | B1 * | 10/2013 | Alsaffar | .................. | H04M 1/04 455/575.4 |
| D725,071 | S * | 3/2015 | Lee | ........................... | D14/138 R |
| 9,442,525 | B2 * | 9/2016 | Choi | ....................... | G06F 1/163 |
| 2005/0277452 | A1 * | 12/2005 | Pasamba | ................ | H04B 1/385 455/575.6 |
| 2007/0145149 | A1 * | 6/2007 | Carnevali | ............... | G06F 1/163 235/486 |
| 2007/0178950 | A1 * | 8/2007 | Lewis | .................... | H04B 1/385 455/575.6 |
| 2011/0294429 | A1 * | 12/2011 | Shirakata | ............. | A61B 5/0002 455/41.2 |

(Continued)

OTHER PUBLICATIONS

"Motorola SG_WT 4023020-06R Wrist Mount with Long Strap" http://salestores.com/motorolasgwt.html#.WGQVaFMrKUk. Retrieved on Dec. 28, 2016.

(Continued)

*Primary Examiner* — Md Talukder

(57) ABSTRACT

A wearable device mount is provided that includes a carrier comprising: a body curved for mounting on a body part, and having top and bottom surfaces, the body comprising a longitudinal axis, a curvature of the body being about perpendicular to the longitudinal axis; a pair of opposing wings on the body, each about perpendicular to the longitudinal axis, and each having a cleat interface side facing the bottom surface; a tab spaced: perpendicularly from the pair of opposing wings, relative to the longitudinal axis, and between the pair of opposing wings; and, a release bar configured to move the tab under pressure between a locking position and an unlocking position. The mount can further include a flexible pad at the bottom of the carrier, and a strap releasably attached to the carrier, which can be tightened using device that shortens the strap.

19 Claims, 14 Drawing Sheets

(56) References Cited

U.S. PATENT DOCUMENTS

| | | | | |
|---|---|---|---|---|
| 2012/0080462 A1* | 4/2012 | Hajarian | ............... | A45F 5/00 224/219 |
| 2012/0255978 A1* | 10/2012 | Williams | ............... | A45F 5/00 224/219 |
| 2013/0235546 A1* | 9/2013 | Sedillo | ............... | H05K 7/02 361/809 |
| 2014/0018128 A1* | 1/2014 | Martin | ............... | G06K 7/0004 455/556.1 |
| 2014/0305985 A1* | 10/2014 | Chang | ............... | A45F 5/021 224/676 |
| 2015/0208793 A1* | 7/2015 | Schulz | ............... | A45F 5/00 224/164 |
| 2015/0223590 A1* | 8/2015 | Arias-Tabima | ............... | A45F 5/021 224/195 |
| 2015/0288407 A1* | 10/2015 | Hernandez | ............... | H04B 1/3888 224/267 |
| 2016/0007158 A1* | 1/2016 | Venkatraman | ............... | H04W 4/023 455/456.2 |
| 2016/0013872 A1* | 1/2016 | Strand | ............... | H04B 13/005 455/41.2 |
| 2016/0174674 A1* | 6/2016 | Oberpriller | ............... | A45F 5/021 224/222 |
| 2016/0218762 A1* | 7/2016 | Tian | ............... | H04B 1/385 |
| 2016/0242531 A1* | 8/2016 | Zerfus | ............... | A45F 5/00 |
| 2016/0242708 A1* | 8/2016 | Kaiser | ............... | A61G 13/101 |

OTHER PUBLICATIONS

WT4090-T2S1GER Specification Sheet. http://www.barcode-arena.com/wt4090-t2s1ger.html?gclid=CPKInOzR3soCFQqPaQodBEsE_A. Retrieved on Feb. 4, 2016.

BOA Closure System Quick Reference Guide 2015/2016. www.BOATechnology.com.

* cited by examiner

4-I

4-II

WEARABLE DEVICE MOUNT

BACKGROUND

Wearable device mounts are becoming ubiquitous, as people use mobile devices more and more in their jobs and everyday lives. For example, personnel in warehouses and/or factories use mobile devices to track and/or identify objects therein through the use of cameras, optical scanners (e.g. barcode scanners and the like), radio frequency identification (RFID) readers, and the like, built into mobile devices; such mobile devices can also be used for communication with wireless networks, such as cell networks, WiFi networks, and the like. As such, the mobile devices generally should be available for use by such personnel on an almost constant basis, and increasingly such devices are being mounted on body parts for easy and quick access. Use of mobile devices in people's everyday lives is also ubiquitous, and increasingly people are mounting such devices to parts of their body, other than a holster, for easy and quick access. For example mobile devices are often mounted on people's bodies using arm straps for use during running and/or at the gym. However, wearable device mounts have heretofore been generally difficult to use, relying on materials and mechanisms that are difficult to mount to or remove from a body part and/or a mobile device, in addition to being difficult to clean.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate implementations of concepts described herein, and explain various principles and advantages of those implementations.

Figure 1:
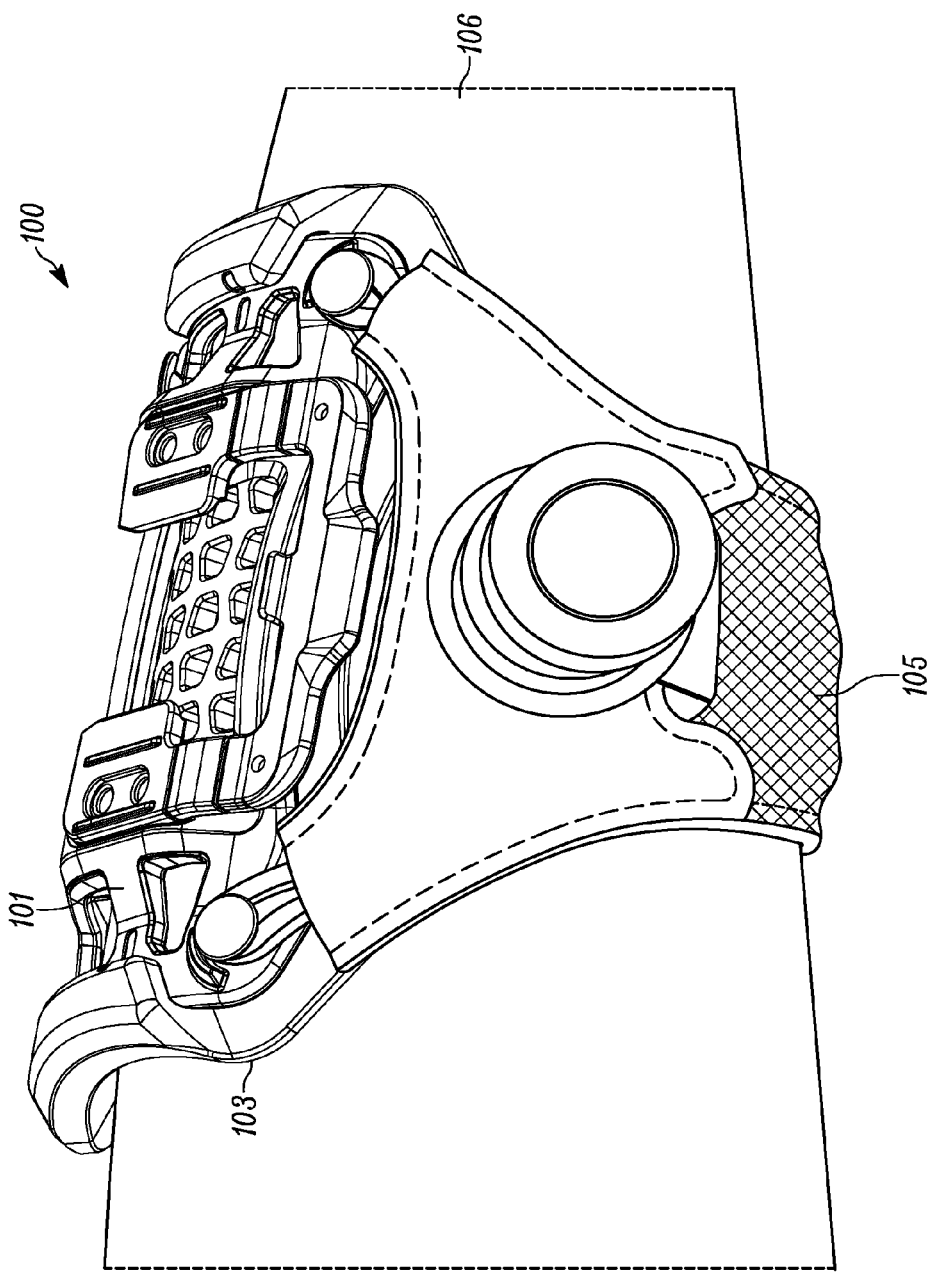
FIG. 1 depicts a perspective view of a wearable device mount in an assembled state, and in an in-use position on an arm, according to non-limiting implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present specification.

The apparatus and method components have been represented where appropriate by conventional symbols in the drawings, showing only those specific details that are pertinent to understanding the implementations of the present specification so as not to obscure the disclosure with details that will be readily apparent to those of ordinary skill in the art having the benefit of the description herein.

DETAILED DESCRIPTION

An aspect of the specification provides a device comprising: a carrier comprising: a body curved for mounting on a body part, and having a top surface and a bottom surface, the body comprising a longitudinal axis, a curvature of the body being about perpendicular to the longitudinal axis; a pair of opposing wings on the body, each about perpendicular to the longitudinal axis, and each having a cleat interface side facing the bottom surface; a tab spaced: perpendicularly from the pair of opposing wings, relative to the longitudinal axis, and between the pair of opposing wings; and, a release bar configured to move the tab under pressure between a locking position and an unlocking position.

The device can further comprise a cleat configured for releasable attachment to the top surface of the carrier, the cleat comprising: a pair of respective opposing wings, each of the pair of respective opposing wings comprising a carrier interface side configured to interface under the cleat interface side of the pair of opposing wings of the carrier; and a slot positioned to receive the tab of the carrier when the pair of respective opposing wings of the cleat are interfaced with the pair of opposing wings of the carrier, when the tab is in the locking position, to hold the cleat in place at the carrier. The cleat can further comprise a mobile device mounting apparatus configured to releasably retain a mobile device at the cleat.

The carrier can further comprise a plurality of loop retaining members, and the device can further comprise a strap assembly comprising: one or more loops at each end of the strap assembly, each configured for placement around a respective loop retaining member of the carrier; and, a tightening device configured to shorten the strap assembly. Each of the plurality of loop retaining members can comprise: a respective rivet extending from the top surface of the body and a respective curved rib adjacent the respective rivet, the respective curved rib located at the top surface and configured to prevent a respective loop from coming off the respective rivet when the respective loop is not under pressure. When the strap assembly is attached to the carrier, the strap assembly can be located about perpendicular to the longitudinal axis of the carrier, connecting opposing sides of the carrier. The strap assembly can further comprise a pair of the loops located at each of opposite ends of the strap assembly, and each pair of the loops can be formed from a single respective cord that is slidable through the strap assembly. The strap assembly can further comprise a pair of the loops located at each of opposite ends of the strap assembly, each pair of the loops can be prevented from sliding into the strap assembly using respective interior sleeves that separate sides of each of the loops.

The device can further comprise a flexible pad extending along the longitudinal axis at the bottom surface of the body, the flexible pad comprising: opposing flexible grips at opposing ends of the flexible pad, each of the opposing flexible grips configured to wrap around at least a portion of respective ends of the carrier for removable attachment thereto; and a respective shoulder under each of the opposing flexible grips, the respective shoulder configured to interface with a respective recess at each of the respective ends of the body thereby holding the flexible pad in a given position relative to body. The flexible pad can further comprise curved flexible ribs on a body-part-facing side opposite a carrier side. The flexible pad can further comprise ribs on a body-part-facing side, configured to prevent the flexible pad from sliding along the body part. The flexible pad can further comprise ventilation holes there through.

The curvature of the body of the carrier can be asymmetric to account for different radii of curvatures of the body part.

The body of the carrier can comprise a plurality of apertures that renders the body flexible.

The device can be further configured to releasably retain a mobile device. The mobile device can be in communication with a scanner. The scanner can be configured to be mounted on another body part.

Attention is directed to FIG. 1 which depicts a perspective view of a wearable device mount 100 in an assembled state, wearable device mount 100 comprising three components: a carrier 101, a flexible pad 103, and a strap assembly 105. In general, carrier 101, flexible pad 103, and strap assembly 105 cooperate to attach wearable device mount 100 to a body part 106, including, but not limited to, an arm, a wrist, and the like (as depicted, an arm). While body part 106 is depicted for illustration, body part 106 does not form part of device 100.

For example, flexible pad 103 can generally be attached to a body-part facing side of carrier 101, as described in detail below, the assembled carrier 101 and flexible pad 103 can be placed along body part 106, a curvature of the assembled carrier 101 and flexible pad 103 aligning with curvature of body part 106. Loops of strap assembly 105 can be then looped around attachment points of carrier 101 and strap assembly can be shortened using a tightening device to fix wearable device mount 100 on body part 106. Alternatively, strap assembly 105 can be attached to carrier 101 prior to mounting wearable device mount 100 onto body part 106, and body part 106 can be slipped through an aperture formed by strap assembly 105 and the assembled carrier 101 and flexible pad 103; wearable device mount 100 can then be positioned on body part 106, and strap assembly 105 can be shortened using the tightening device to frictionally retain wearable device mount 100 on body part 106. As described in more detail below, carrier 101 is configured to removably mount a mobile device thereto, for example using a cleat mounted to (and or integrated with) the mobile device, the cleat in turn configured to mate with a releasable mounting mechanism of carrier 101.

In general, each of carrier 101, flexible pad 103, and strap assembly 105 can be made from flexible materials, and/or rendered flexible and/or bendable through the use of apertures, holes and the like. In some implementations, flexible pad 103 comprises a material that is softer and/or more flexible than carrier 101. Furthermore, strap assembly 105 comprises a washable and/or wipeable and/or easily cleanable cloth material and/or plastic cloth material such that strap assembly 105 van bend around and conform to body part 106 around which strap assembly 105 is being tightened.

Indeed, the material of each of carrier 101, flexible pad 103, and strap assembly 105 is selected to be washable and/or wipeable and/or easily cleanable (e.g. using water and/or cleaning solutions and/or sterilizing solutions), whether each of carrier 101, flexible pad 103, and strap assembly 105 are assembled or disassembled. For example, carrier 101 can comprise a hard plastic that can be rendered at least partially flexible through the use of apertures and/or holes there through; however, parts of carrier 101 can comprise metal, and/or plastic molded over metal, to provide stability to carrier 101. Flexible pad 103 can comprise one or more of a soft plastic, rubber, silicone and the like to provide comfort as flexible pad 103 generally provides an interface between carrier 101 and body part 106. Strap assembly 105 can comprise a washable and/or wipeable and/or easily cleanable cloth material and/or plastic cloth material, as described above; in particular, strap assembly 105 does not include hook and loop materials, such as Velcro™, as such materials are difficult to keep clean and tend to collect dirt and other materials that can impede the function thereof.

Each of carrier 101, flexible pad 103, and strap assembly 105 are now described in more detail.

Figure 2:
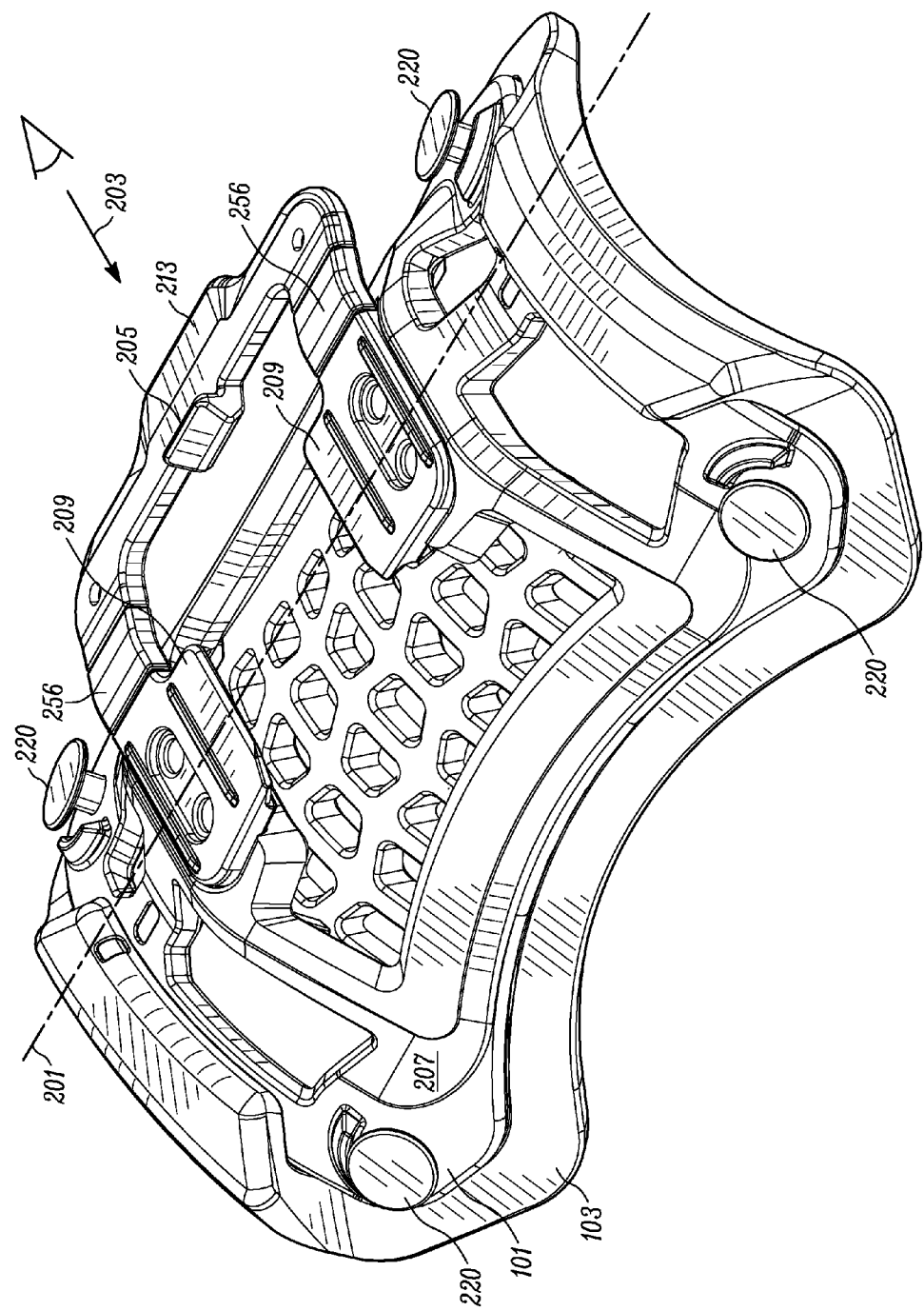
FIG. 2 depicts a perspective view of a carrier and a flexible pad of the wearable device mount of FIG. 1, in an assembled state, according to non-limiting implementations.
Figure 3:
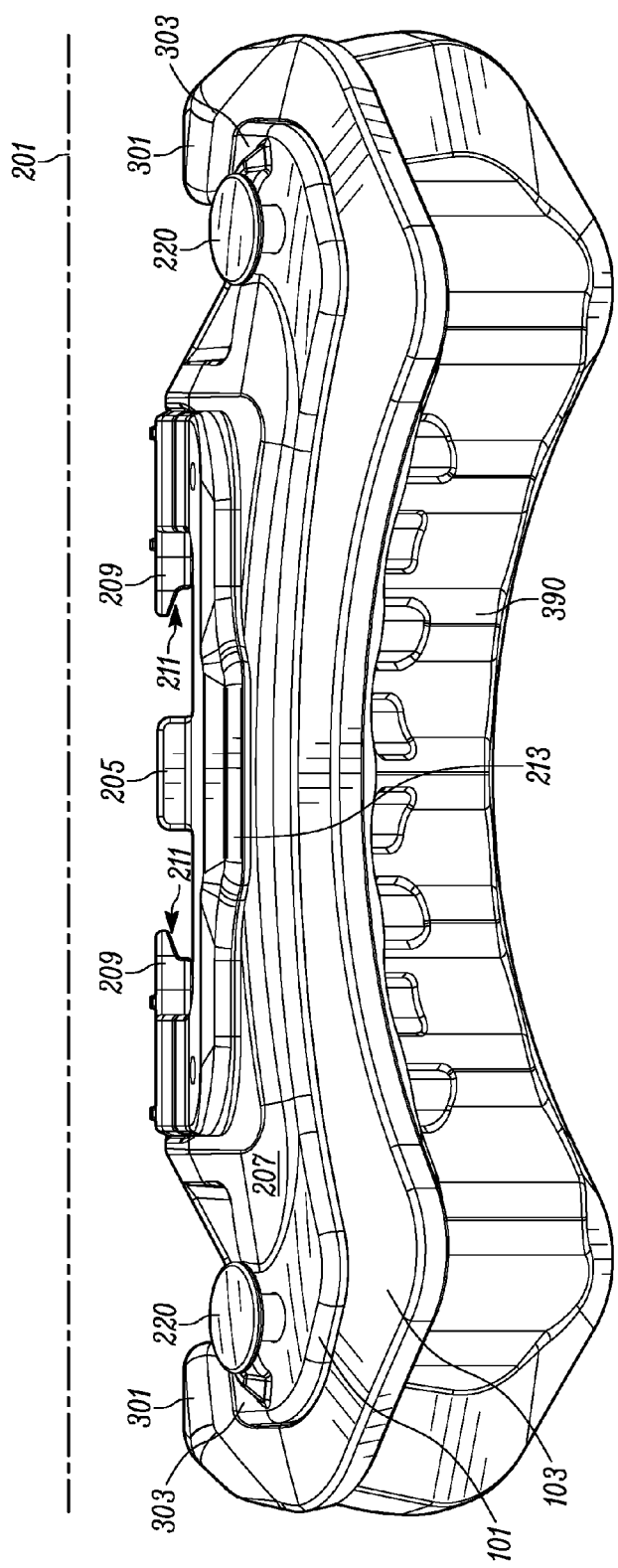
FIG. 3 depicts a release-bar side view of the carrier and flexible pad of FIG. 2, according to non-limiting implementations.
Figure 4:
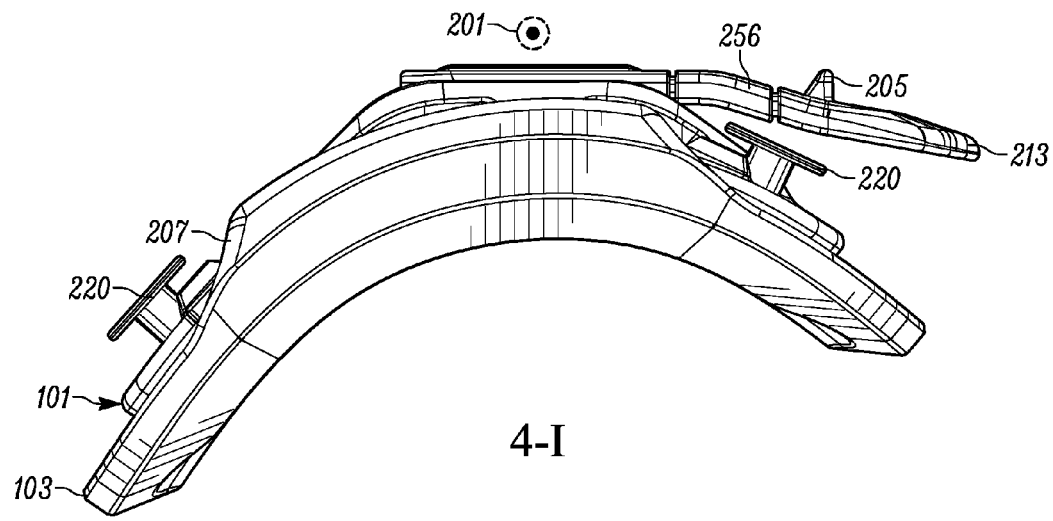
FIG. 4 depicts side views of the carrier and flexible pad of FIG. 2, down a longitudinal axis, with a tab and release bar in a locking position and an unlocking position, according to non-limiting implementations.
Figure 4:
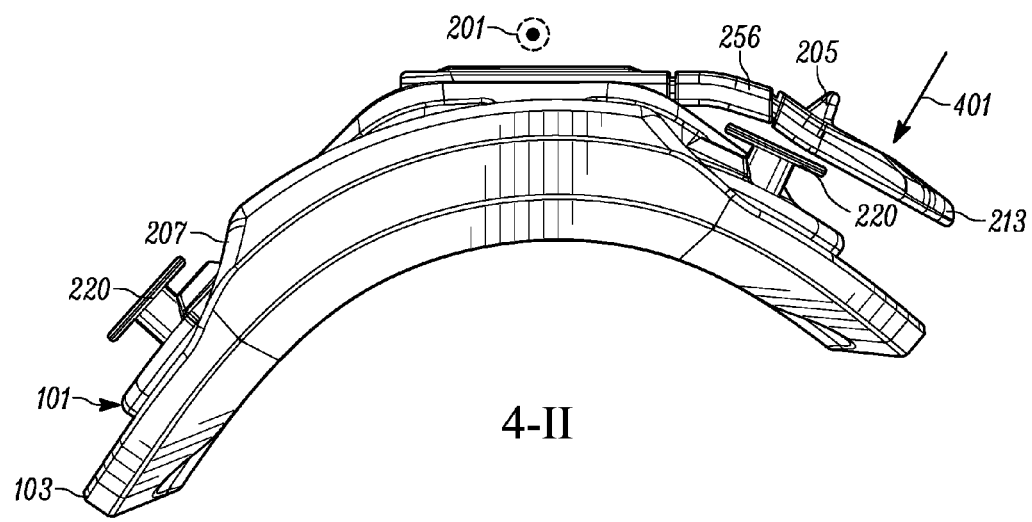
Figure 5:
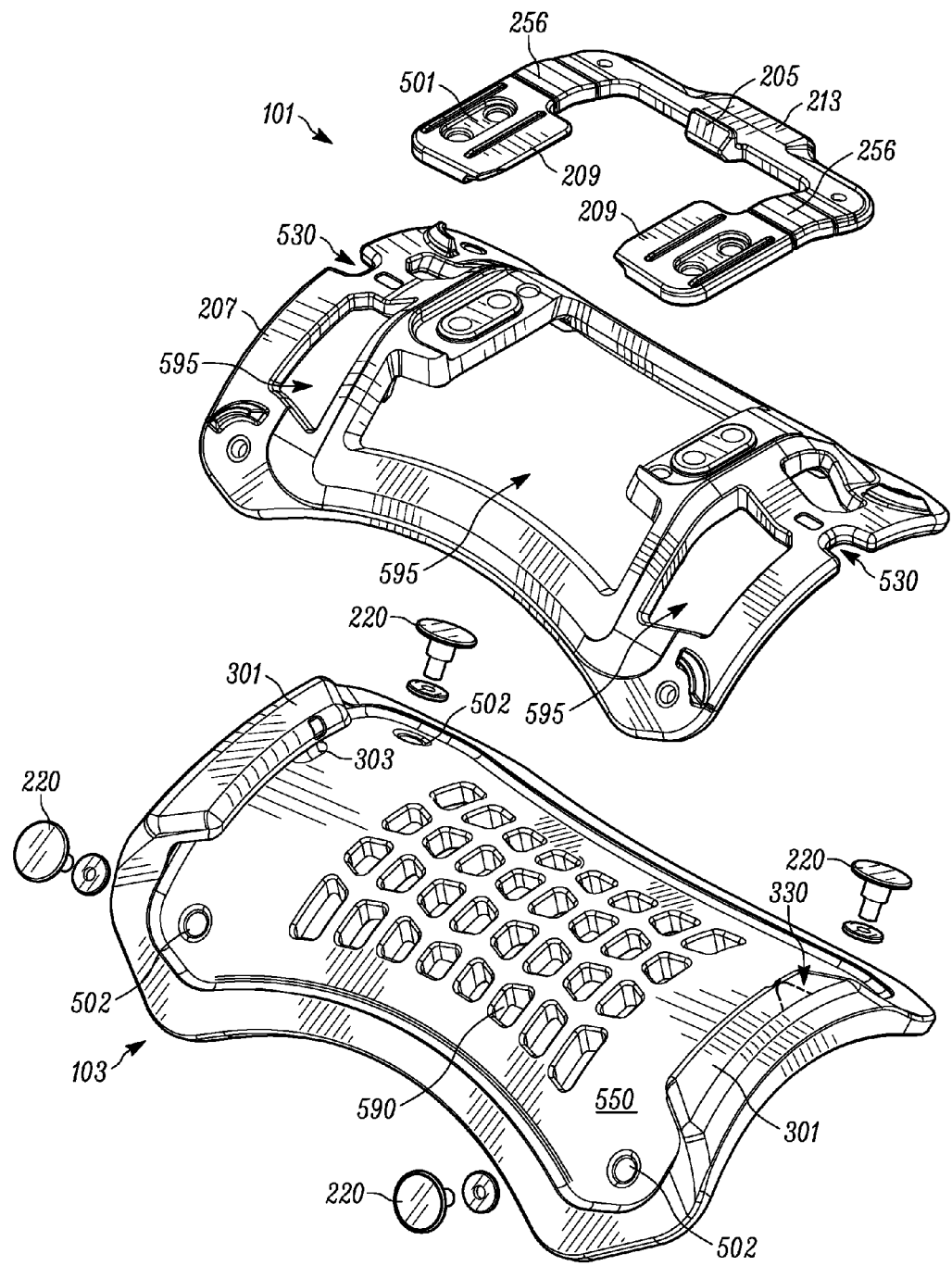
FIG. 5 depicts an exploded view of the carrier and flexible pad of FIG. 2, according to non-limiting implementations.

Attention is next directed to FIG. 2, FIG. 3, and FIG. 4. In particular: FIG. 2 depicts a perspective view of carrier 101 and flexible pad 103 in assembled state and includes an indication of a longitudinal axis 201 of carrier 101; FIG. 3 depicts a side view of carrier 101 and flexible pad 103 in the assembled state, and in particular along a release-bar side of carrier 101, that is parallel to longitudinal axis 201, as indicated by arrow 203 in FIG. 2; and FIG. 4 depicts side views 4-I, 4-II of carrier 101 and flexible pad 103 in the assembled state along longitudinal axis 201 (which is into and/or out of the page in FIG. 3), with a tab 205 and release bar 213 of carrier 101 in a locking position in view 4-I and in an unlocking position in view 4-II, as described in further detail below. Reference will also be made to FIG. 5, which depicts an exploded view of carrier 101 and flexible pad 103

Figure 9:
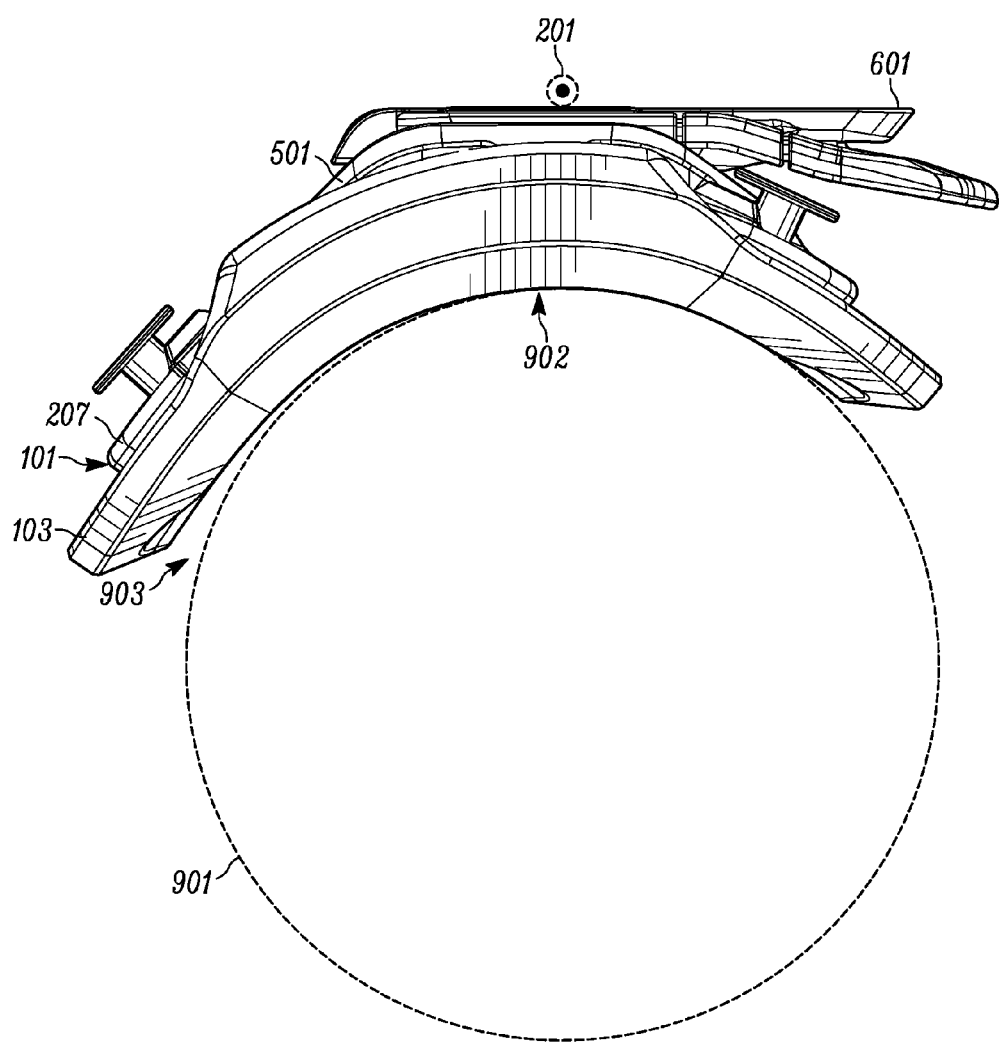
FIG. 9 depicts the curvature of the carrier and flexible pad mated with the cleat of FIG. 7, according to non-limiting implementations.

Carrier 101 comprises: a body 207 curved for mounting on a body part, and having a top surface (visible in FIGS. 2 to 5) and a bottom surface (opposite the top surface), body 207 comprising longitudinal axis 201, a curvature of body 207 being about perpendicular to longitudinal axis 201 (as best seen in FIG. 4 and FIG. 9); a pair of opposing wings 209 on body 207, each about perpendicular to longitudinal axis 201, and each having a cleat interface side 211 (as best seen in FIG. 3) facing the bottom surface and/or away from the top surface; tab 205 spaced: perpendicularly from the pair of opposing wings 209, relative to longitudinal axis 201, and between the pair of opposing wings; and, a release bar 213 configured to move tab 205 under pressure between a locking position (as depicted in view 4-I of FIG. 4) and an unlocking position (as depicted in view 4-II of FIG. 4).

Release bar 213 is generally attached to the remainder of carrier 101 using one or more biasing devices 256 and/or one or more flexible materials, including, but not limited to, rubber, silicone and the like. For example, biasing devices 256 can connect release bar 213 to the remainder of carrier 101 and biasing devices 256 can comprise a respective metal insert that extends from each opposing wing 209 towards release bar 213, each respective metal being internal to carrier 101, and coated with a flexible material at least in the region of each biasing device 256; the metal insert can provide biasing functionality and the flexible material can provide flexibility; such flexible materials can include, but are not limited to, rubber, silicone, soft plastics, and the like. As tab 205 generally extends from release bar 213, pressure applied to release bar 213 causes tab 205 and release bar 213 to move from the locking position to the unlocking position. Furthermore, release bar 213 (and hence tab 205) is biased by the one or more biasing devices 256 towards the locking position.

For example, with reference to FIG. 4, tab 205 is generally located on release bar 213, extending away from the top surface of carrier 101. Release bar 213, and hence tab 205, is biased towards a locking position by biasing devices 256, as depicted in view 4-I; and release bar 213, and hence tab 205 can be moved to an unlocking position, as depicted in view 4-II, when pressure is applied thereto, for example by way of a finger and/or a applying pressure to a top of release bar 213 (as indicated by arrow 401), which causes the biasing devices 156 to flex and/or bend. When pressure is released from release bar 213, release bar 213, and hence tab 205, is biased back towards the locking position in view 4-I, by biasing devices 256.

In some implementations, as depicted in FIG. 5, carrier 101 can be configured for assembly from a plurality of components, including a cleat interface portion 501 comprising wings 209, release bar 213, flexibly attached to wings 209, and tab 205. For example, cleat interface portion 501 can be U-Shaped (with release bar 213 extending between two portions that in turn comprise a respective wing 209 thereby forming a "U") and removably attached to body 207. Indeed, in FIGS. 2 to 4, while cleat interface portion 501 is not indicated, it is appreciated that cleat interface portion 501 can be present and attached to body 207 using one or more of a mechanical attachment device, rivets, screws, fasteners, epoxy, and the like. However, in other implementations, carrier 101 can comprise primarily an integrated structure without a separate and/or removable cleat interface portion.

Furthermore, at least a portion of carrier 101 (and/or when present, cleat interface portion 501), including, but not limited to release bar 213, can comprise plastic molded over metal.

As also depicted in FIGS. 2 to 5, and in described in more detail below, carrier 101 can further comprise a plurality of loop retaining members 220, for example one loop retaining member 220 at each corner of carrier 101 and/or body 207. In some implementations, as depicted, each loop retaining member 220 can comprise a respective rivet extending from the top surface of body 207; as best appreciated from FIG. 5, in some implementations, each rivet can extend from a respective hole in carrier 101, with a washer, or the like, retaining the rivet in place at a bottom side of body 207 and/or a bottom side of flexible pad 103. In the former implementation, as depicted in FIG. 5, flexible pad 103 can comprise a respective recess 502 for receiving each washer, or the like, on a carrier-facing side (only three of recesses 502 being visible in FIG. 5). Interaction of the plurality of loop retaining members 220 with strap assembly 105 will be described in further detail below.

Figure 6:
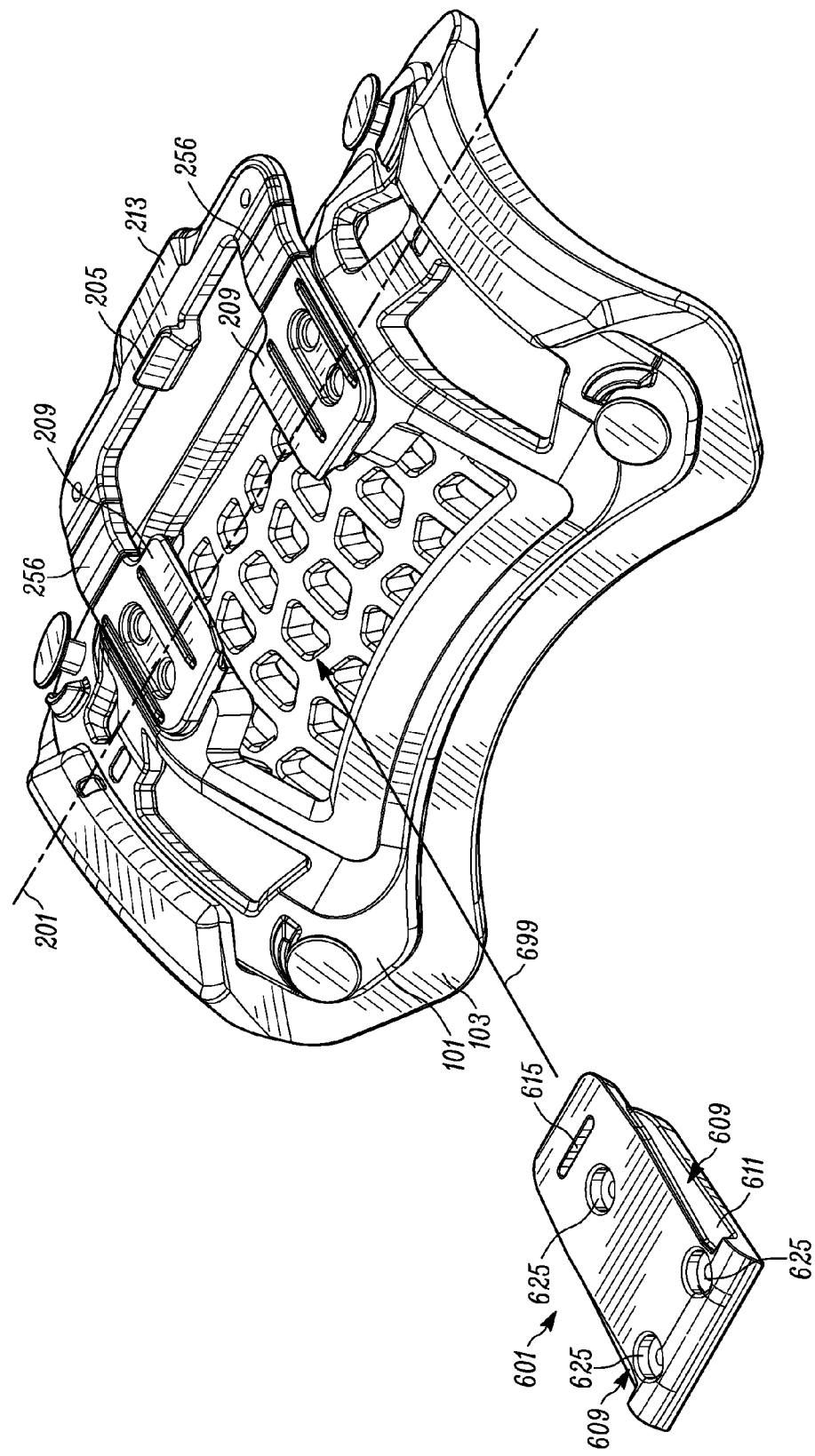
FIG. 6 depicts the carrier and flexible pad of FIG. 2, being mated with a cleat, according to non-limiting implementations.

Attention is next directed to FIG. 6 which depicts carrier 101 and flexible pad 103 in an assembled state, similar to FIG. 2, with like elements having like numbers, and a cleat 601 configured to mate with carrier 101, and specifically wings 209 and tab 205. While, for clarity, not all components are indicated in FIG. 6, they are appreciated to be nonetheless present.

In particular, cleat 601 is configured for releasable attachment to the top surface of carrier 101, cleat 601 comprising: a pair of respective opposing wings 609, each of the pair of respective opposing wings 609 comprising a carrier interface side 611 (only one of which is indicated and/or visible in FIG. 6) configured to interface under cleat interface side 211 of the pair of opposing wings 209 of the carrier 101; a slot 615 positioned to receive tab 205 of carrier 101 when the pair of respective opposing wings 609 of cleat 601 are interfaced with pair of opposing wings 209 of the carrier 101, when tab 205 is in the locking position, to hold cleat 601 in place at carrier 101. Cleat 601 can comprise one or more materials similar to the materials of carrier 101.

As depicted, cleat 601 further comprises a mobile device mounting apparatus 625 configured to releasably retain a mobile device at cleat 601. For example, as depicted, mobile device mounting apparatus 625 comprises three apertures through which corresponding fasteners can be inserted from a bottom of cleat (assuming that a top side and/or a mobile-device-facing side of cleat 601 is depicted in FIG. 6), to mate with corresponding holes and/or fasteners at a surface of a mobile device.

Alternatively, cleat 601 can be removably or permanently attached to the mobile device. In some implementations, cleat 601 can be provided and/or sold with wearable device mount 100; alternatively cleat 601 can be provided and/or sold separate from wearable device mount 100; in yet further implementations, cleat 601 can be provided and/or sold with a mobile device to be mounted on wearable device mount 100 using cleat 601. In yet further implementations, clear 601 can be integrated with a mobile device, for example molded into a body and/or external chassis of the mobile device.

Figure 7:
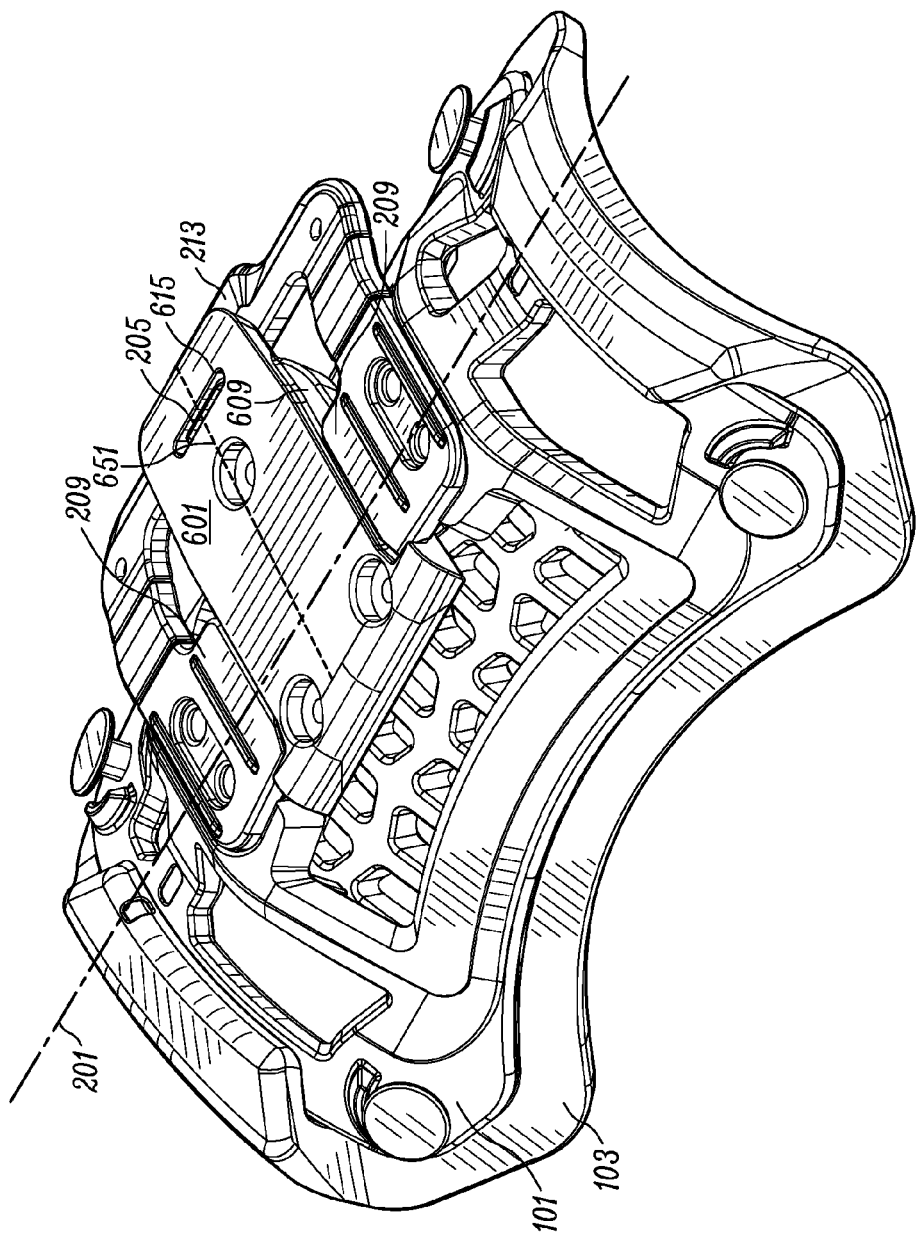
FIG. 7 depicts the carrier and flexible pad of FIG. 2, mated with a cleat, according to non-limiting implementations.

In a mating operation, cleat 601 is moved towards carrier 101 in a direction indicated by arrow 699 to slide wings 609 under respective wings 209, as described in further detail with reference to FIG. 7, which depicts cleat 601 mated with carrier 101. FIG. 7 is otherwise substantially similar to FIG. 6, with like elements having like numbers. While, for clarity, not all components are indicated in FIG. 7, they are appreciated to be nonetheless present.

During the mating operation indicated by arrow 699, slot 615 slides between opposing wings 209 of carrier 101, and wings 609 of cleat 601 slide "under" corresponding wings 209 of carrier 101; when in a retained position and/or a mated position, slot 615 receives tab 205. Hence, each pair of wings 209, 609 are spaced complementary to each other such that wings 609 slide under, and are retained by, wings 209. Furthermore, slot 615 is positioned on cleat 601 in a complementary position to tab 205. For example, FIG. 7 further depicts a respective longitudinal axis 651 of cleat 601, with wings 609 being spaced symmetrically about longitudinal axis 651, and slot 615 is displaced along longitudinal axis 651 relative to wings 609, and centered on longitudinal axis 651. Hence, the geometry of wings 609 relative to slot 615 is complementary to the geometry of wings 209 relative to tab 205.

Hence, at least wings 209 and tab 205 together comprise a releasable mounting mechanism of carrier 101.

Furthermore, as is also understood from FIG. 7, in a retained position and/or mated position, longitudinal axis 651 of cleat 601 is about perpendicular to longitudinal axis 201 of carrier 101. Hence assuming that: when wearable device mount 100 is mounted to a body part, such as an arm, longitudinal axis 201 of carrier 101 extends along the body part; and that a mobile device mounted to cleat 601 is oriented along longitudinal axis 651; then the mobile device will also be about perpendicular to longitudinal axis 201 and hence also perpendicular to the body part. Orientations of a mobile device mounted to carrier 101 will be described in further detail below with reference to FIG. 14.

During the mating process, an underside (e.g. a carrier-facing side) of cleat 601 can place pressure on tab 205 to displace tab 205 and/or release bar 213 (e.g. by translating applied pressure to biasing devices 256) until slot 615 is aligned with tab 205; then the biasing of release bar 213, via biasing devices 256, will cause tab 205 to move into and/or mate with slot 615. To release cleat 601, pressure can be placed on release bar 213, to move tab 205 out of slot 615 and therefor allow cleat 601 to slide out from between wings 209 in a direction opposite arrow 609.

Figure 8:
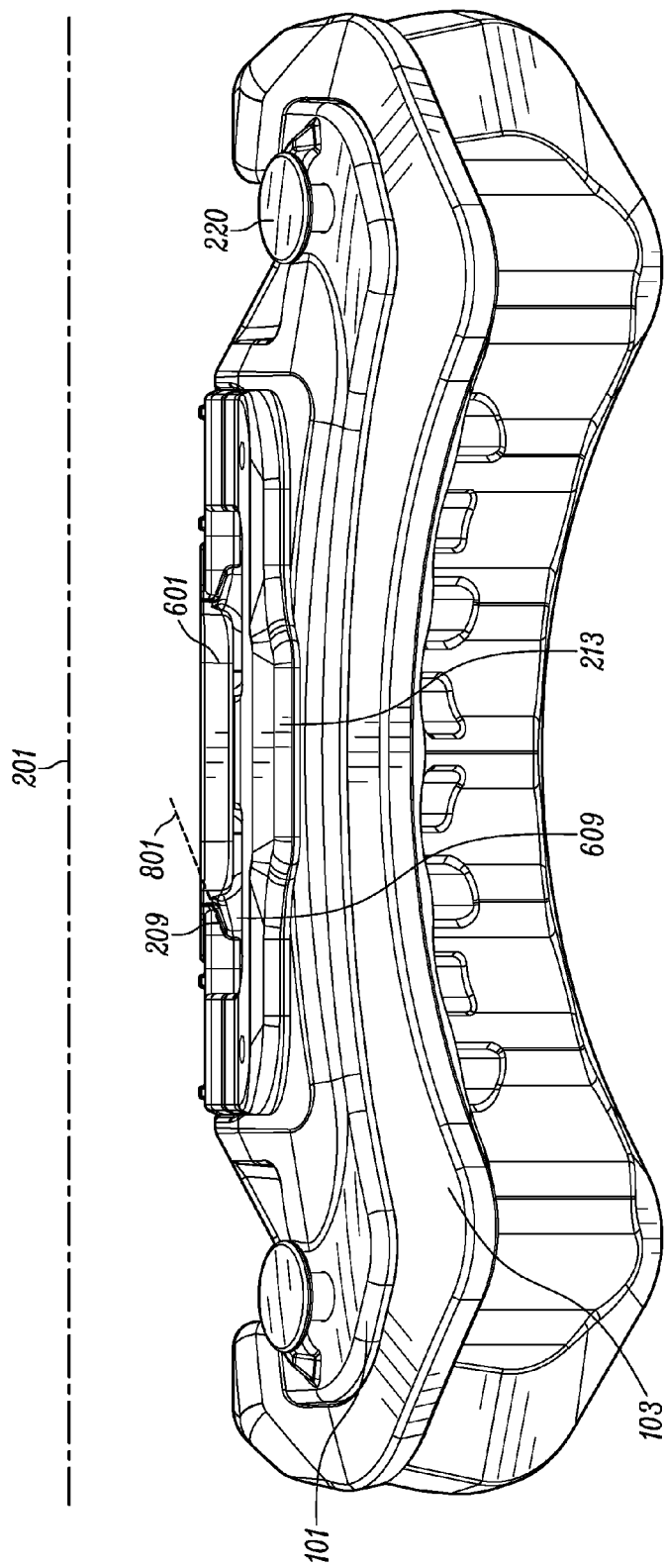
FIG. 8 depicts a release-bar side view of the carrier and flexible pad mated with the cleat of FIG. 7, according to non-limiting implementations.

Attention is next directed to FIG. 8 which shows a side view of carrier 101 and flexible pad 103 in an assembled state, when cleat 601 is mated with carrier 101, along a release-bar side of carrier 101. In other words, FIG. 8 is similar to FIG. 3, with like elements having like numbers. While, for clarity, not all components are indicated in FIG. 8, they are appreciated to be nonetheless present.

In particular, one wing 209 of carrier 101 is indicated, as is a corresponding wing 609 of cleat 601, as well as a line 801 that extends from an interface there between, when wings 209, 609 are mated. In other words, in FIG. 8, cleat interface side (e.g. cleat interface side 211 shown in FIG. 3) of the indicated wing 209 has mated with the corresponding carrier interface side (e.g. carrier interface side 611 shown in FIG. 6) of the indicated wing 609. In particular, an angle between line 801 and longitudinal axis 201 of carrier 101 can be about 10°, however larger or smaller angles are within the scope of present implementations including, but not limited to, angles in a range of about 5° to about 45°, though larger or smaller angles can also be used. In particular, an angle can be selected that results in a pull force of about 18 kilograms, applied to cleat 601 and/or a mated mobile device, causing cleat 601 to become disengaged from carrier 101, however larger or smaller pull forces are within the scope of present implementations.

For example, given a particular set of materials, coefficients of static friction and flexibility of each of wings 209, 609, an angle there between can be selected such that a given pull force causes cleat 601 to disengage from carrier 101 for safety reasons. Hence, when cleat 601 and/or a mobile device mated therewith becomes caught on an object, which can be dangerous especially if the object is large and/or moving, then cleat 601 can disengage from carrier 101 when the pull force reaches a threshold, such as about 16 kilograms. Hence, other pull forces and other angles between each of wings 209, 609 are within the scope of present implementations, and each can be selected according to given safety specifications.

Flexible pad 103 will now be described in more detail with attention directed back to FIGS. 3 and 5. In particular, as best seen in FIG. 3, flexible pad 103 can extend along longitudinal axis 201 at the bottom surface of body 207, flexible pad 103 comprising: opposing flexible grips 301 at opposing ends of flexible pad 103, each of opposing flexible grips 301 configured to wrap around at least a portion of respective ends of carrier 101 for removable attachment thereto; and a respective shoulder 303 (as best seen in FIG. 5) under each of opposing flexible grips 301, the respective shoulder 303 configured to interface with a respective recess 530 (as best seen in FIG. 5) at each of the respective ends of body 207 thereby holding flexible pad 103 in a given position relative to body 207. In FIG. 5, one of shoulders 303 is depicted in stippled lines indicating that the shoulder 303 is under the respective flexible grip 301.

For example, as also depicted in FIG. 5, a carrier-facing side of flexible pad 103 can comprise a recess 550 having a shape complementary to carrier 101, and carrier 101 can be inserted into recess 550, with flexible pad 103 and/or opposing flexible grips 301 being flexed and/or bent and/or distorted such that opposing flexible grips 301 wrap around at least a portion of respective ends of carrier 101. For example, as depicted, each of opposing flexible grips 301 comprise an L-shaped grip that extends from a main portion of flexible pad 103 around a respective end of carrier 101 (e.g. L-shaped with respect to a remaining portion of flexible pad 103); in other words, each flexible grip 301 is configured to wrap around and retain a respective end of each carrier 101.

Furthermore, recess 550 comprises a recess that is defined by shoulders extending in a perimeter around flexible pad 103, the shoulders and/or perimeter being of a shape that is complementary to respective edges of carrier 101, such that carrier 101 can reside in recess 550 and/or be received in recess 550; as such, recess 550 can assist in holding carrier 101 in position with respect to flexible pad 103, in cooperation with opposing flexible grips 301. However, recess 550 can be optional.

Furthermore, a respective shoulder 303 is positioned to mate with and/or interface with and/or otherwise be held in place by a respective recess 530 of carrier 101, a shape and/or configuration of each recess 530 being generally complementary to a shape and/or configuration of a corresponding shoulder 303. While each shoulder 303, and hence each recess 530, are depicted as extending towards each other, in other implementations, shoulders 303 and recesses 530 need not be facing towards each other.

In any event, the features of opposing flexible grips 301, as well as shoulders 303 and recesses 530 can enable easy assembly and disassembly of carrier 101 and flexible pad 103 for cleaning.

Attention is again directed to FIG. 3 which depicts a further optional feature of flexible pad 103, and in particular, curved flexible ribs 390 on a body-part-facing side of flexible pad 103, opposite a carrier side of flexible pad 103. For example, such ribs 390 on the body-part-facing side can be configured to prevent the flexible pad from sliding along the body part to which flexible pad 103 is mounted. In other words, such ribs 390 can increase the friction between flexible pad 103 and the body part to which wearable device mount 100 is mounted. In yet further implementations ribs 390 and/or a body-part-facing side of flexible pad 103 can include texturing to further increase the friction between flexible pad 103 and the body part to which wearable device mount 100 is mounted.

Attention is again directed to FIG. 5 which depicts a further optional feature of flexible pad 103, and in particular, ventilation apertures 590 there through. As depicted, ventilation apertures 590 are arranged in a grid pattern that can contour to the shape of flexible pad 103. For example, edges of flexible pad 103 that are aligned with longitudinal axis 201 can be scalloped (as depicted), as are corresponding edges of carrier 101, and the grid pattern of ventilation apertures 590 can follow the scalloped edges. The ventilation apertures 590 allow for skin in contact with flexible pad 103 to breathe and/or be exposed to air there through. Further, the scalloping of edges of flexible pad 103 and carrier 101, and in particular scalloping of the edges that are parallel to longitudinal axis 201, can be for ergonomics. For example, such scalloping can be used to minimize material used in forming one or more of flexible pad 103 and carrier 101 to reduce the weight thereof, for user comfort. Furthermore, such scalloping provides corners that extend along sides of a body part, when device 1000 is attached thereto, as seen in each of FIGS. 1 and 13; as loop retaining members 220 are located at each corner of carrier 101, loop retaining members 220 also extend along sides of a body part, and tension can be applied two points on opposite ends of device 100 (and on each side of device 100, relative to longitudinal axis 201) to better hold device 100 in place on the body part and/or to provide better comfort.

Similarly, and also with reference to FIG. 5, body 207 of carrier 101 can comprise a plurality of apertures 595 that can renders body 207 flexible and/or provide ventilation and/or access of air to ventilation apertures 590. In particular, a center aperture in body 207 can be located under wings 209 such that cleat 601 is held in place over the central aperture, and hence air can flow under cleat 601, and through ventilation apertures 590, 595.

In the foregoing discussion of carrier 101 and flexible pad 103, specific implementations have been described. However, one of ordinary skill in the art appreciates that various modifications and changes can be made without departing from the scope of the specification as set forth in the claims below For example, attention is next directed to FIG. 9, which depicts a side view, along longitudinal axis 201 of carrier 101 and flexible pad 103 in an assembled state, and when cleat 601 is mated with carrier 101. Indeed, FIG. 9 is substantially similar to view 4-I of FIG. 4, other than cleat 601 being mated to carrier 101, with like elements having like numbers. While, for clarity, not all components are indicated in FIG. 9, they are appreciated to be nonetheless present.

Also depicted in FIG. 9 is a curvature of carrier 101 and/or body 207 and/or flexible pad 103, (which generally conforms to the curvature of carrier 101 and/or body 207) the curvature indicated by circle 901 following the curve of the bottom and/or body-part-facing side 902 of flexible pad 103. It is apparent from the diversion 903 of circle 901 from flexible pad 103 that the curvature of body 207 is asymmetric, for example to account for different radii of curvatures of the body part. Furthermore, cleat interface portion 501 is asymmetrically located on body 207, away from diversion 903, to allow for the asymmetrically curved portion of body 207 to curve around an outside of a body part, such as an arm. In other words, a releasable mounting mechanism of carrier 101

Strap assembly 105 will now be described in more detail with reference to FIG. 10 to FIG. 13.

Figure 10:
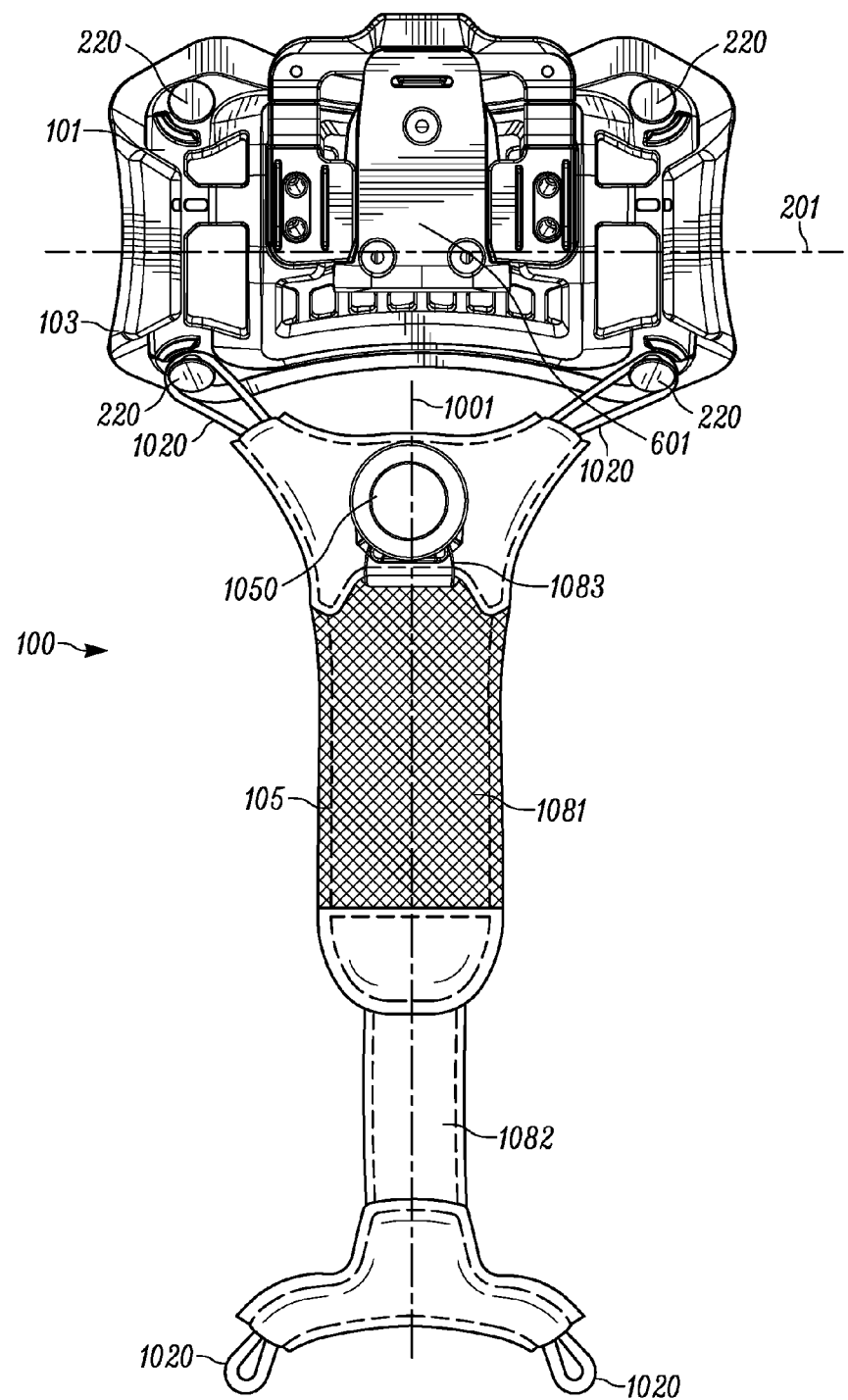
FIG. 10 depicts a strap assembly of the wearable device mount of FIG. 1, according to non-limiting implementations.

Hence, attention is next directed to FIG. 10, which depicts wearable device mount 100 in a partially assembled state (and not necessarily to scale); in particular, carrier 101 and flexible pad 103 are in an assembled state, with optional cleat 601 attached to carrier 101, as well as strap assembly 105 partially attached to carrier 101. A respective longitudinal axis 1001 of strap assembly 105 is also depicted, as well as longitudinal axis 201 of carrier 101. While, for clarity, not all components of wearable device mount 100 are indicated in FIG. 10, they are understood to be nonetheless present.

Also indicated in FIG. 10 are each of the plurality of loop retaining members 220 of carrier 101; as depicted, a loop retaining member 220 is located at each corner of carrier 101. As can also be seen in FIG. 10, strap assembly 105 comprises: one or more loops 1020 at each end and/or corner of strap assembly 105, each loop 1020 configured for placement around a respective loop retaining member 220 of the carrier 101; and, a tightening device 1050 configured to shorten strap assembly 105. In some implementations, one or more loops 1020 can be elastic.

As depicted two of loops 1020 at a first end of strap assembly 105 are placed around a respective two loop retaining members 220 of carrier 101 such that longitudinal axis 1001 of strap assembly 105 is about perpendicular to longitudinal axis 201 of carrier 101; a remaining two loops 1020 at a second end of strap assembly 105, opposite the first end along longitudinal axis 1001, are not placed around respective two loop retaining members 220 of carrier 101; hence, wearable device mount 100 is partially assembled. To fully assemble wearable device mount 100, strap assembly 105 can be bent and/or folded and/or circled around a body part, and/or under carrier 101 (with reference to the page of FIG. 10) to attach the remaining two loops 1020 to respective loop retaining members 220, for example as depicted in FIG. 1. Hence, when strap assembly 105 is attached to carrier 101, strap assembly 105 is located about perpendicular to longitudinal axis 201 of carrier 101, connecting opposing sides of carrier 101, the opposing sides of carrier 101 on opposite sides of longitudinal axis 201.

As also depicted in FIG. 10, strap assembly 105 can comprise a first portion 1081 and a second portion 1082, second portion 1082 configured to slide relative and/or into first portion 1081 (as depicted) or vice versa. Tightening device 1050 can be located on first portion 1081, as depicted, and comprise a ratchet configured to shorten a cord 1083 that is in turn internally attached to second portion 1082; hence, when the ratchet is turned, cord 1083 can pull second portion 1082 into first portion 1081 and/or slide second portion 1082 towards first portion 1081. Furthermore, the ratchet can be tightened and/or ratcheted into place when a desired degree of shortening of strap assembly 105 (e.g. around a body part) has occurred, and then released to lengthen strap assembly 105, for example to remove wearable device mount 100 from the body part.

Figure 11:
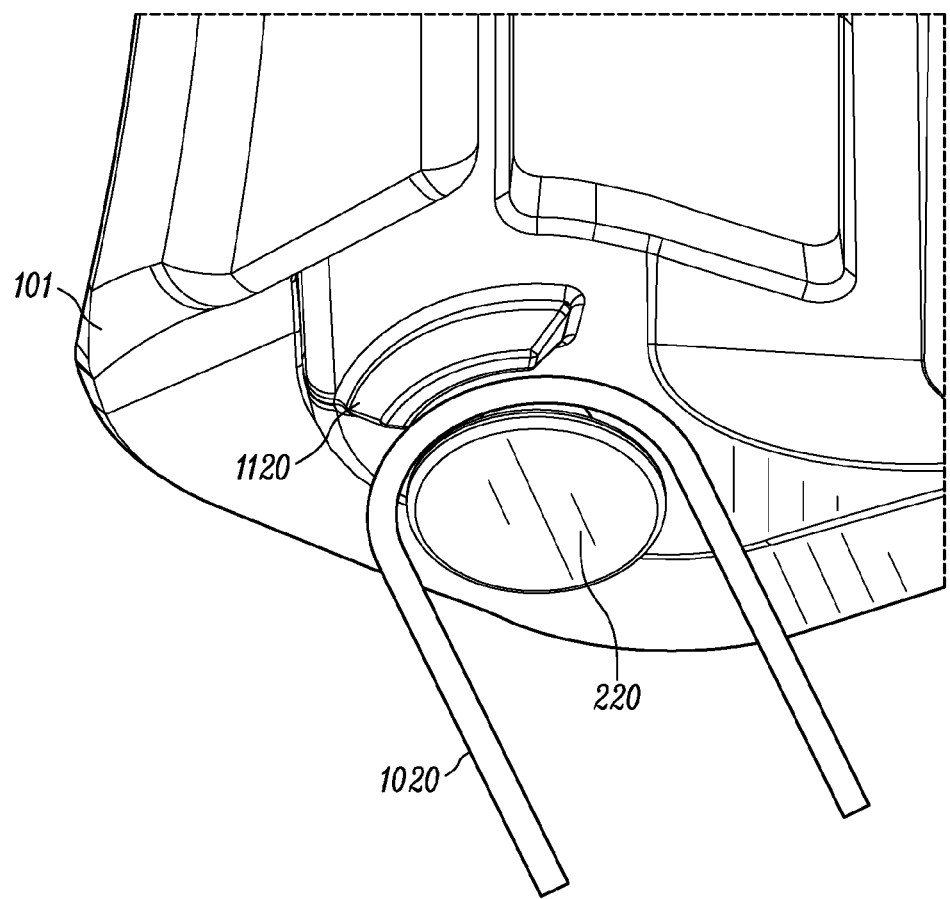
FIG. 11 depicts detail of a loop of the strap assembly of FIG. 10 placed at a loop retaining member of the carrier, according to non-limiting implementations.

Attention is next directed to FIG. 11, which depicts details of a loop 1020 retained by a respective loop retaining member 220 of carrier 101. In depicted implementations each loop retaining member 220 can comprise a respective rivet. In FIG. 11, loop 1020 has been placed around the depicted rivet; when strap assembly 105 is shortened, loop 1020 will be tightened against the rivet, however when strap assembly 105 is not shortened, or is otherwise loosely attached to carrier 101 and/or loop retaining member 220 and/or the rivets, a loop 1020 could slip off of a respective loop retaining member 220 and/or a respective rivet.

Hence, to assist with retention of loop 1020 in at least an untightened state, carrier 101 can further comprise a respective curved rib 1120 adjacent each respective loop retaining member 220 and/or respective rivet, the respective curved rib 1120 located at the top surface of body 207 and configured to prevent a respective loop 1020 from coming off the respective loop retaining member 220 and/or respective rivet when the respective loop 1020 is not under pressure and/or not tightened. Hence, a height, and position of each rib 1120 can be selected such that a distance between a top of each rib 1120, and an outside edge of a respective loop retaining member 220 and/or an outside edge of a head of a respective rivet, is about the same as a diameter of a loop 1020, and/or slightly smaller or slightly bigger than a diameter of a loop 1020.

For example, the distance between a top of each rib 1120 and an outside edge of a head of the depicted rivet can be selected so that a respective loop 1020 will fit there between, and frictionally be held in place at the rivet using rib 1120.

A curvature of rib 1120 can be selected to be similar to a curvature of the respective loop retaining member 220 and/or respective rivet. Furthermore, each rib 1120 extends only partially around the respective loop retaining member 220 and/or respective rivet, for example up to about a quarter of the way around the respective loop retaining member 220 and/or respective rivet so as to not interfere with the path of a loop 1020 as it extends back towards strap assembly 105. Furthermore, a rib 1120 is located on carrier 101 such that an end of a respective loop 1020 is adjacent thereto when retained by a respective loop retaining member 220 and/or respective rivet.

Figure 12:
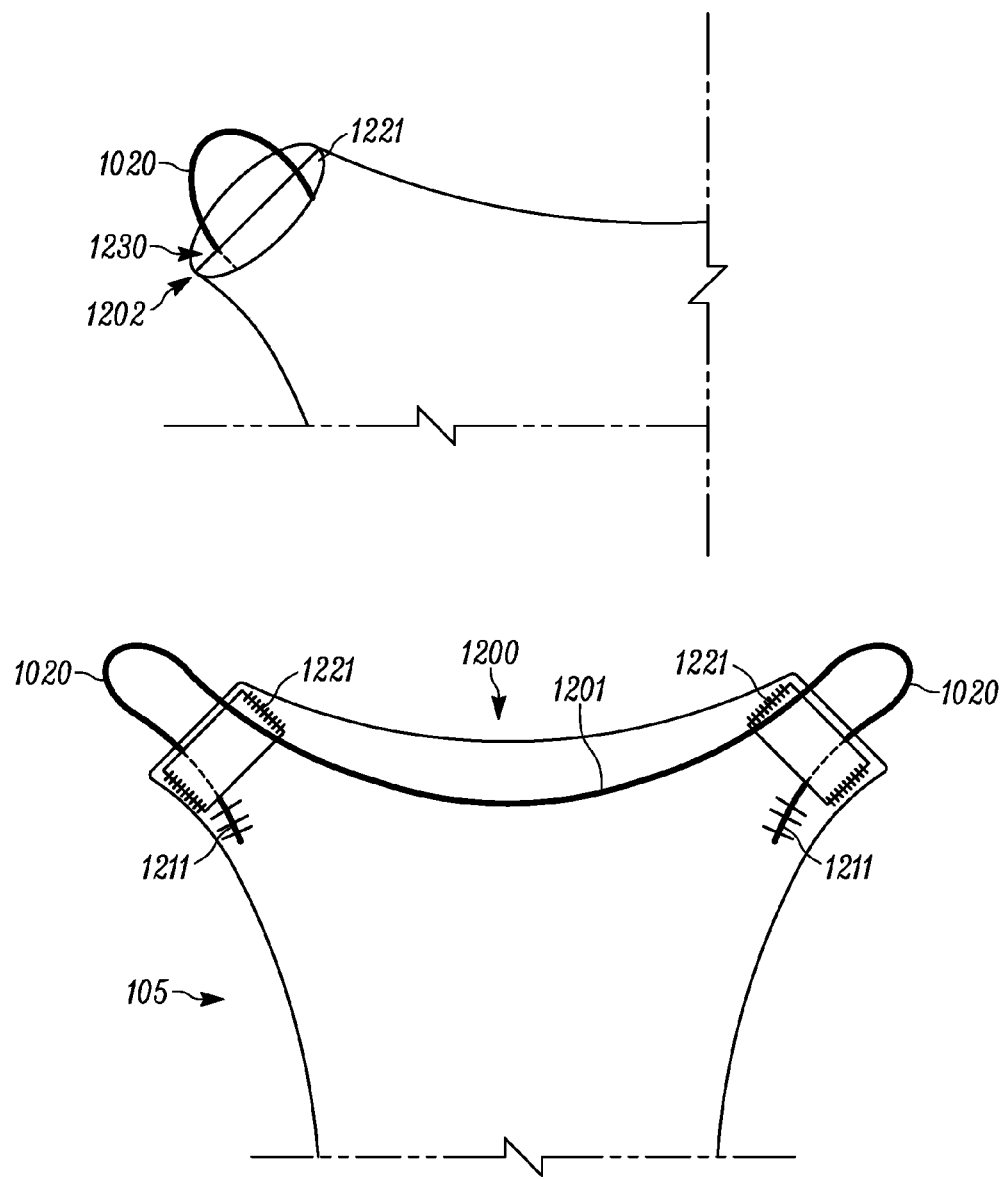
FIG. 12 depicts details of the loops of the strap assembly of FIG. 10, according to non-limiting implementations.

Attention is next directed to FIG. 12 which depicts a portion of an internal structure of strap assembly 105 according to non-limiting implementations, and in particular, a structure of a given pair of loops 1020, at an end 1200 for example at a first or second end of strap assembly, given that strap assembly 105 comprises a pair of loops 1020 located at each of opposite ends of strap assembly 105 along longitudinal axis 1001. Furthermore, FIG. 12 shows detail 1202 of one of loops 1020 as it exits a corner of end 1001. Detail 1202 is appreciated to be present at each corner of end 1001.

It is further assumed that the structure depicted in FIG. 12 is internal to strap assembly 105 and that an external cover has been removed, other than in detail 1202.

As seen in FIG. 12, in these implementations, each pair of loops 1020 can be formed from a single respective cord 1201 that is slidable through strap assembly 105, strap assembly 105 comprising internal components for fixing ends of cord 1201 thereto and forming the pair of loops 1020. In some implementations, cord 1201 can be elastic; for example, in specific non-limiting implementations, cord 1201 can comprise a 3 mm thick elastic cord, however cords of other thicknesses, either elastic or inelastic, are within the scope of present implementations.

In depicted implementations, cord 1201 extends between two attachment points 1211 on opposite sides of end 1001; for example, each attachment point 1221, can comprise industrial thread used to sew ends of cord 1201 to an interior of strap assembly 105.

Cord 1201 further extends around sleeves 1221, one sleeve 1221 adjacent to each corner and/or each opening 1230. Sleeves 1221 are each open on a side adjacent opening 1230, and an opposite side, and otherwise sewn and or fixed to strap assembly 105. Hence each sleeve 1221 forms two flexible apertures: a first aperture between a sleeve 1221 and an interior cover of strap assembly 105, to which each sleeve 1221 can be sewn; and a second aperture between sleeve 1221 and an exterior cover of strap assembly 105. The exterior cover and the interior cover can be sewn together, for example, to contain interior components of strap assembly 105, such as cord 1201. For example, FIG. 10 is appreciated to show an exterior cover, and FIG. 13, described below, is appreciated to show an interior cover (the terms exterior and interior being used relative to a body-part to which device 101 is to be attached; in other words, the interior cover is located on an "interior" side, of strap assembly 105, that faces a body-part when device 100 is attached thereto, and the exterior cover is located on an "exterior" side, of strap assembly 105, that faces away from the body-part when device 100 is attached thereto) While the positions and shape of each sleeve 1221 are shown to illustrate functionality thereof, in other implementations, each sleeves 1221 can be integrated with a larger portion of flexible material that is sewn together with the exterior cover and the interior cover; for example, sleeves 1221 can be formed by a portion of flexible material that is sewn together, and sandwiched, between the exterior cover and the interior cover.

From an attachment point 1211, cord 1201 extends out of opening 1230 on one side of a closest a sleeve 1221, and loops around back through opening 1230 on an opposite side of the closest sleeve 1221; in other words, cord 1201 loops around through both aperture of sleeve 1221. Sleeve 1221 generally prevents loop 1020 from slipping inside strap assembly 105, as best seen in detail 1202, as sleeve 1221 is located between opposite ends of loop 1020.

Cord 1201 then follows a curve and/or a physical configuration of end 1200 (and contained therein by the external cover), and forms a second loop 1020 that is also constricted using a second sleeve 1211, and then back to a second attachment point 1211.

As loops 1020 at end 1200 are connected, and further as cord 1201 can slide through strap assembly (e.g. between the exterior and interior covers), one loop 1020 can lengthen at the expense of the other loop 1020 shortening, so that strap assembly 105 can be placed around a body part having a taper.

While a specific implementation of strap assembly 105 is depicted in FIG. 12, other implementations are within the scope of present implementations using different combinations of loops and/or elastic loops at ends and/or corners of strap assembly 105 Indeed, in general, implementations of strap assembly 105 described herein can generally obviate the use of hook and loop straps, such as Velcro™, which can be difficult to clean and become unhygienic over time.

Figure 13:
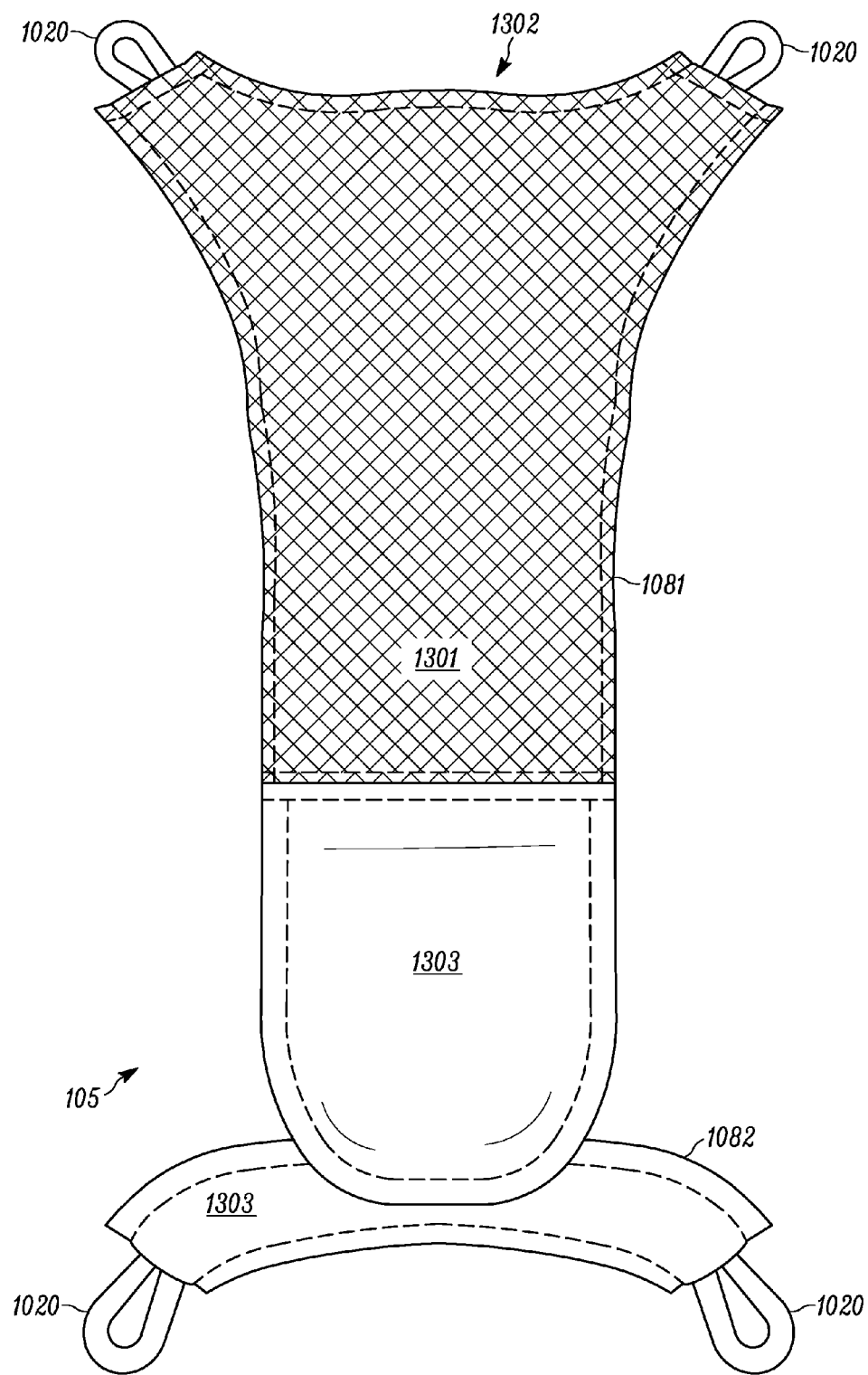
FIG. 13 depicts a rear side the strap assembly of FIG. 10, in a tightened position, according to non-limiting implementations

Attention is next directed to FIG. 13 which depicts a rear side and/or a body-part facing side of strap assembly 105 in a position where a second portion 1082 has been pulled into first portion 1081, for example relative to the position of strap assembly 105 depicted in FIG. 10. Specifically, FIG. 13 depicts a rear side and/or a body-part facing side of each of first portion 1081 and second portion 1082, and in particular an interior cover of each. In particular, the interior cover (e.g. a body-part facing side) of first portion 1081 comprises a gripping material (e.g. configured to grip skin of a body-part) located on about two-thirds of first portion 1081, starting from an end 1302 adjacent tightening device 1083 (e.g. with reference to FIG. 10), and the remainder thereof comprises a non-gripping material 1303 (e.g. a smooth material configured to slide along the skin of the body-part) along the remaining one third. In addition, the interior cover of second portion 1082 comprises also non-gripping material 1303 (which can be the same or different as the non-gripping material used in first portion 1081). Hence, when strap assembly 105 is tightened onto a body-part, gripping material 1301 on first portion 1081 grips the skin thereof, and non-gripping material 1303 can slide along the skin for ease of tightening.

Furthermore, while the ratio of gripping material 1301 to non-gripping material 1302 of the interior cover of first portion 1081 is depicted herein as being about ⅔ of first portion 1081 to ⅓ of first portion 1081, other ratios are within the scope of present implementations. In particular, gripping material 1301 is at least located in a region of tightening device 1083 (e.g. on an opposite side of first portion 1081), and non-gripping material 1303 is at least located at an end of first portion 1081 adjacent second portion 1082 (e.g. an end of first portion 1081 into which second portion 1082 slides when tightening device 1083 is used to pull on second portion 1082). For example, assuming that tightening device 1083 comprises a ratchet that a user pulls to release, when strap assembly 105 is released, the pulling of tightening device 1083 causes gripping material 1301 to be pulled away from the skin of the body part, and non-gripping material 1303 of both first portion 1081 and second portion 1082 to slide relative to the skin of the body-part to which device 100 is attached. Hence, non-gripping material 1303 located at least at an end of first portion 1081 adjacent second portion 1082 provides comfort to the user during the release of strap assembly 105 as non-gripping material 1303 located at least at an end of first portion 1081 adjacent second portion 1082 prevents strap assembly 105 from tugging at the skin.

Figure 14:
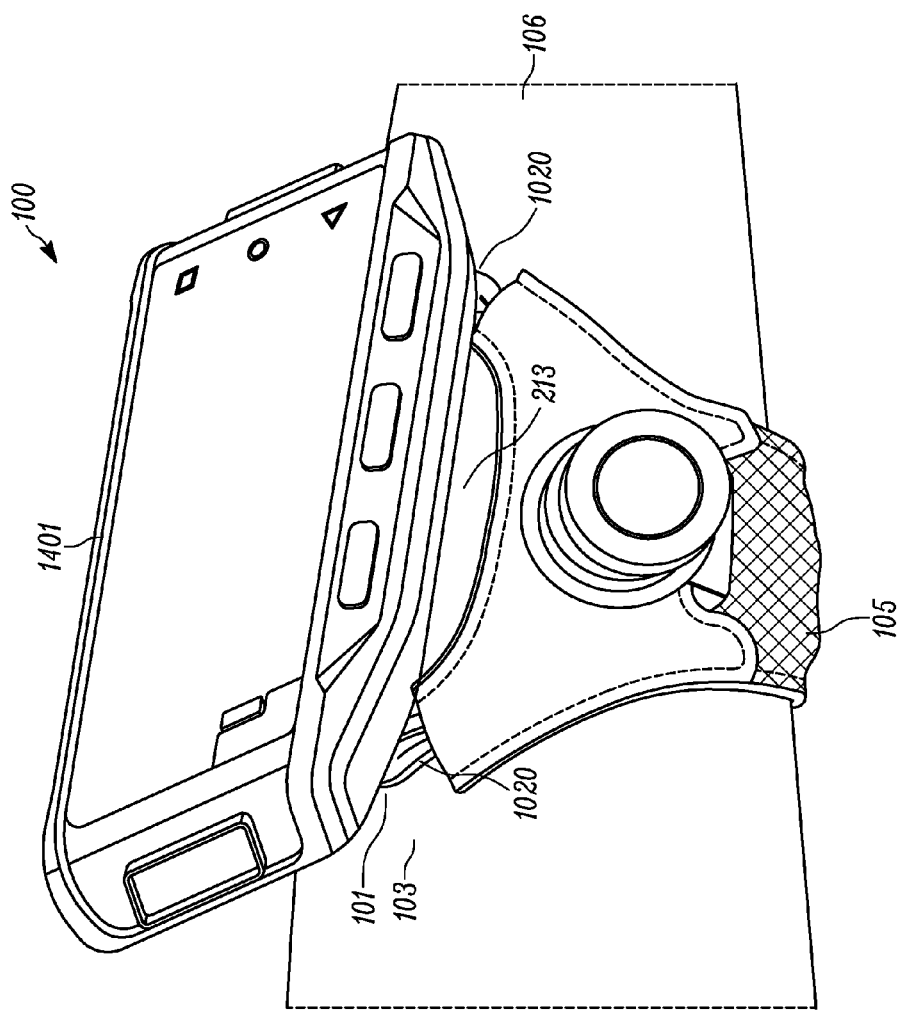
FIG. 14 depicts a perspective view of the wearable device mount of FIG. 1, in an in-use position on an arm, and with a mobile device mounted thereto, according to non-limiting implementations.

Attention is next directed to FIG. 14, which depicts device 100 mounted to body part 106, and is substantially similar to FIG. 1, with like elements having like numbers; however in FIG. 14 a mobile device 1401 is mounted to carrier 101 using a cleat (not depicted but understood to be mounted to mobile device 1401 and attached to carrier 101). Release bar 213 can be used to release mobile device 1401 from carrier 101, as described above.

Furthermore, mobile device 1401 is generally oriented along and/or perpendicular to body part 106, due to the general orientation of the cleat to carrier 101, as described above with respect to FIG. 6 and FIG. 7.

As also depicted in FIG. 14, body part 106 can be tapered; hence, as described above with respect to FIG. 12 and FIG. 14, a loop 1020 (e.g. on a left side of FIG. 14) on a wider side of the taper is longer at the expense of a loop 1020 (e.g. on a right side of FIG. 14) on the shorter side of the taper.

Hence, device 100 generally enables a mobile device to be conveniently mounted to a body part, even body parts having a taper, with the mobile device conveniently oriented along the body part or perpendicular thereto. Furthermore, device 100 can easily be attached to and removed from the body part using the aforementioned strap assembly 105, that relies on loops rather than hook and loop devices. Device 100 can be generally simple to disassemble, and materials of device 100 are further selected to be washable and/or wipeable such that device 100 can easily disassembled and cleaned.

In an embodiment, the mobile device 1401 includes processor, a screen, and/or one or more buttons configured to interface with a user. In one embodiment, the mobile device 1401 provides a user interface for a scanning device that is in communication with the mobile device 1401. The scanning device is connected to the mobile device 1401 via a wireless (e.g., Bluetooth™) and/or wired connection and may be mounted on the same or a different body part as the mobile device 1401. In one embodiment, the scanning device is mounted to a user's finger(s), arm, wrist, hip, head, or torso. The mobile device 1401 may likewise be mounted to an arm, including a wrist. In a further embodiment, the mobile device 1401 is wirelessly connected to a plurality of scanning devices. In yet another embodiment, the mobile device 1401 includes a built-in scanning device. The scanning device is configured to acquire data, such as barcode data from a barcode, and includes one or more of an imager and a laser scanner. In an embodiment, the mobile device 1401 and/or the scanning device include data acquisition components, such as radio frequency identification (RFID) and/or near field communication (NFC) circuitry.

In the foregoing specification, specific implementations have been described. However, one of ordinary skill in the art appreciates that various modifications and changes can be made without departing from the scope of the specification as set forth in the claims below.

For example, thicknesses, shapes and materials of devices described herein, such as carrier 101, cleat 601, wings 209, 609 can be varied and/or selected to adjust flexibility thereof, as can shapes of apertures therein, including, but not limited to, apertures 595. For example, at least a shape and/or size and/or configuration of the central aperture 595 of carrier 101 (as best seen in FIG. 5) can be varied and/or selected to provide a desired degree of flexibility to carrier 101, and can also depend on type of material from which carrier 101 is constructed and/or manufactured.

Furthermore, while wearable device mount 100 can be provided and/or sold as a single unit, in other implementations one or more of carrier 101, flexible pad 103 and strap assembly 105 can be provided and/or sold individually. For example, one or more of carrier 101, flexible pad 103 and strap assembly 105 can be provided and/or sold individually as replacement parts for wearable device mount 100. Alternatively, as flexible pad 103 and strap assembly 105 are generally in contact with skin, individual personnel of a company and/or entity can be issued with a flexible pad 103 and a strap assembly 105 that is to be used solely by the individual, and the individual can be issued a carrier 101 and a mobile device equipped with a cleat 601 for a duration of a shift.

Furthermore, while carrier 101 and flexible pad 103 have been described herein as being enabled to be conveniently disassembled from each other, in some alternative implementations, carrier 101 and flexible pad 103 can be fused to one another.

Furthermore, while particular shapes and/or designs of each of carrier 101, flexible pad 103 and strap assembly 105 are depicted, for example the scalloping of carrier 101 and flexible pad 103, and seam patterns of strap assembly 105 (as seen in FIG. 10), in other implementations, wearable device mount 100 can deviate from such particular shapes and/or designs without affecting the functional nature of the components described herein.

Hence, provided herein is a wearable device mount that can be easily disassembled and cleaned, and further easily and quickly be attached, and removed, from a body part using the strap assembly.

In the foregoing specification, specific implementations have been described. However, one of ordinary skill in the art appreciates that various modifications and changes can be made without departing from the scope of the specification as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

We claim:

1. A device comprising:
   a carrier comprising:
      a body curved for mounting on a body part, and having a top surface and a bottom surface, the body comprising a longitudinal axis, a curvature of the body being about perpendicular to the longitudinal axis;
      a pair of opposing wings on the body, each about perpendicular to the longitudinal axis, and each having a cleat interface side facing the bottom surface;
      a tab spaced: perpendicularly from the pair of opposing wings, relative to the longitudinal axis, and between the pair of opposing wings; and
      a release bar configured to move the tab under pressure between a locking position and an unlocking position; and
   a cleat configured for releasable attachment to the top surface of the carrier, the cleat comprising: a pair of respective opposing wings, each of the pair of respective opposing wings comprising a carrier interface side configured to interface under the cleat interface side of the pair of opposing wings of the carrier; and a slot positioned to receive the tab of the carrier when the pair of respective opposing wings of the cleat are interfaced with the pair of opposing wings of the carrier, when the tab is in the locking position, to hold the cleat in place at the carrier.

2. The device of claim 1, wherein the cleat further comprises a mobile device mounting apparatus configured to releasably retain a mobile device at the cleat.

3. The device of claim 1, wherein the carrier further comprises a plurality of loop retaining members, the device further comprising a strap assembly comprising: one or more loops at each end of the strap assembly, each configured for placement around a respective loop retaining member of the carrier; and, a tightening device configured to shorten the strap assembly.

4. The device of claim 3, wherein each of the plurality of loop retaining members comprises: a respective rivet extending from the top surface of the body and a respective curved rib adjacent the respective rivet, the respective curved rib located at the top surface and configured to prevent a respective loop from coming off the respective rivet when the respective loop is not under pressure.

5. The device of claim 3, wherein, when the strap assembly is attached to the carrier, the strap assembly is located about perpendicular to the longitudinal axis of the carrier, connecting opposing sides of the carrier.

6. The device of claim 3, wherein the strap assembly further comprises a pair of the loops located at each of opposite ends of the strap assembly, each pair of the loops being formed from a single respective cord that is slidable through the strap assembly.

7. The device of claim 3, wherein the strap assembly further comprises a pair of the loops located at each of opposite ends of the strap assembly, each pair of the loops prevented from sliding into the strap assembly using respective interior sleeves that separate sides of each of the loops.

8. The device of claim 1, further comprising a flexible pad extending along the longitudinal axis at the bottom surface of the body, the flexible pad comprising: opposing flexible grips at opposing ends of the flexible pad, each of the opposing flexible grips configured to wrap around at least a portion of respective ends of the carrier for removable attachment thereto; and a respective shoulder under each of the opposing flexible grips, the respective shoulder configured to interface with a respective recess at each of the respective ends of the body thereby holding the flexible pad in a given position relative to body.

9. The device of claim 8, wherein the flexible pad further comprises curved flexible ribs on a body-part-facing side opposite a carrier side.

10. The device of claim 8, wherein the flexible pad further comprises ribs on a body-part-facing side, configured to prevent the flexible pad from sliding along the body part.

11. The device of claim 8, wherein the flexible pad further comprises ventilation holes there through.

12. The device of claim 1, wherein the curvature of the body is asymmetric to account for different radii of curvatures of the body part.

13. The device of claim 1, wherein the body comprises a plurality of apertures that renders the body flexible.

14. The device of claim 1 further configured to releasably retain a mobile device.

15. The device of claim 14 wherein the mobile device is in communication with a scanner.

16. The device of claim 15 wherein the scanner is configured to be mounted on another body part.

17. A device comprising:
- a carrier comprising:
  - a body curved for mounting on a body part, and having a top surface and a bottom surface, the body comprising a longitudinal axis, a curvature of the body being about perpendicular to the longitudinal axis;
  - a pair of opposing wings on the body, each about perpendicular to the longitudinal axis, and each having a cleat interface side facing the bottom surface;
  - a tab spaced: perpendicularly from the pair of opposing wings, relative to the longitudinal axis, and between the pair of opposing wings; and
  - a release bar configured to move the tab under pressure between a locking position and an unlocking position,
- wherein,
  - the carrier further comprises a plurality of loop retaining members,
  - the device further comprising a strap assembly including one or more loops at each end of the strap assembly, each configured for placement around a respective loop retaining member of the carrier, and a tightening device configured to shorten the strap assembly.

18. The device of claim 17 further comprising a cleat configured for releasable attachment to the top surface of the carrier, the cleat comprising: a pair of respective opposing wings, each of the pair of respective opposing wings comprising a carrier interface side configured to interface under the cleat interface side of the pair of opposing wings of the carrier; and a slot positioned to receive the tab of the carrier when the pair of respective opposing wings of the cleat are interfaced with the pair of opposing wings of the carrier, when the tab is in the locking position, to hold the cleat in place at the carrier.

19. The device of claim 17, wherein the strap assembly further comprises a pair of the loops located at each of opposite ends of the strap assembly, each pair of the loops being formed from a single respective cord that is slidable through the strap assembly.

\* \* \* \* \*